Nov. 4, 1969  A. A. LACHANCE  3,476,216
SAFETY DEVICE FOR AUTOMATIC GROCERY CARTS
Filed Dec. 14, 1967  2 Sheets-Sheet 2
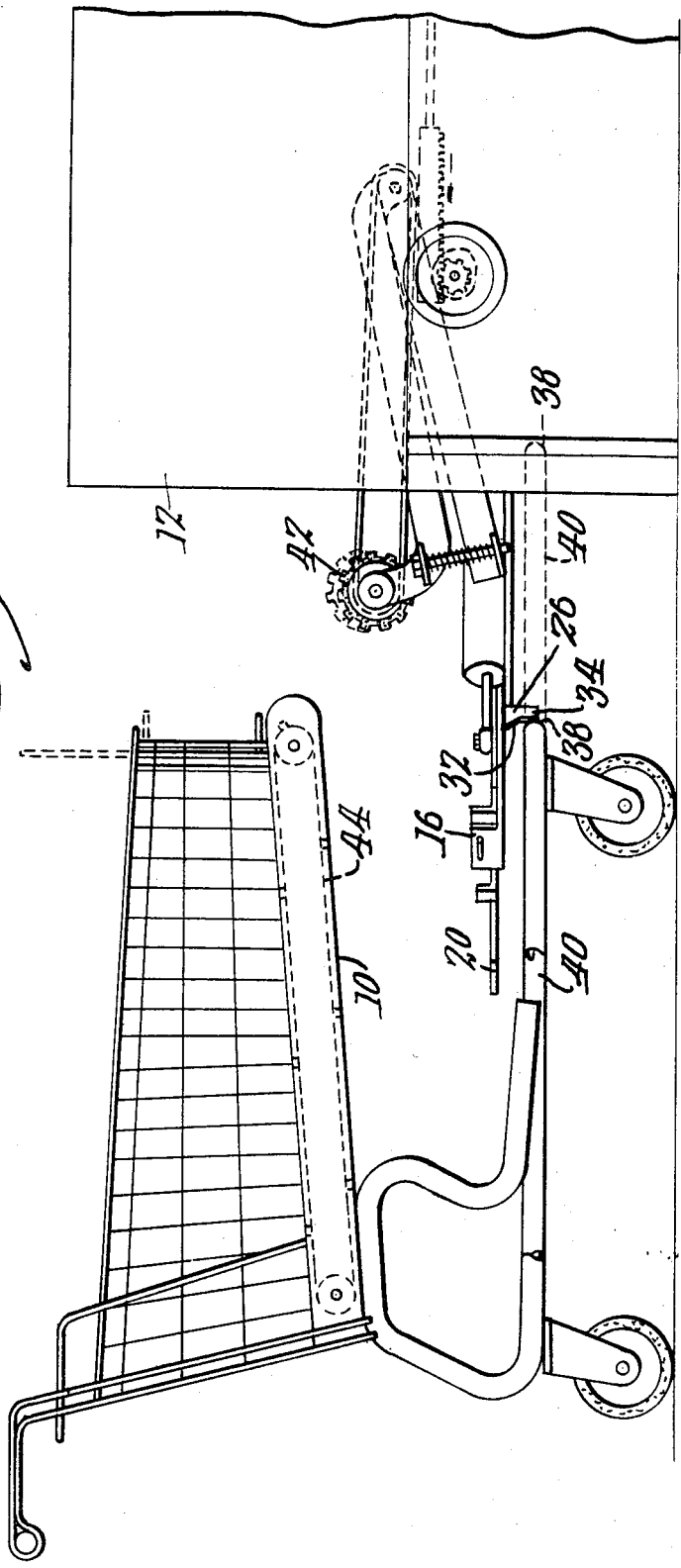
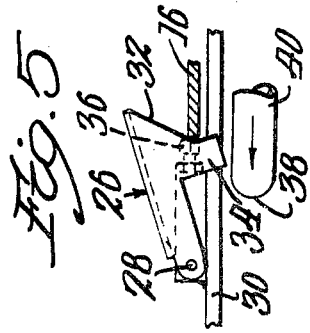
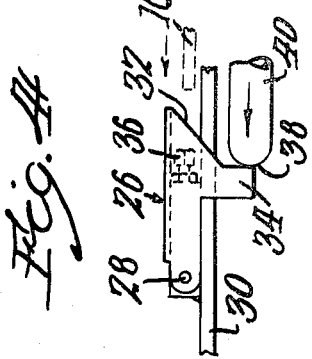
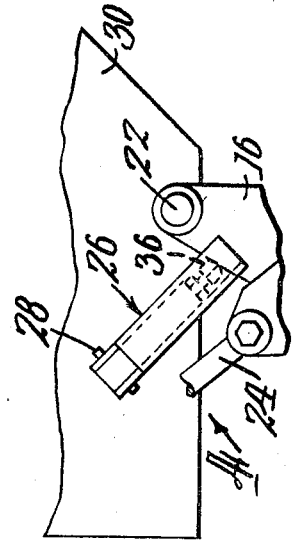

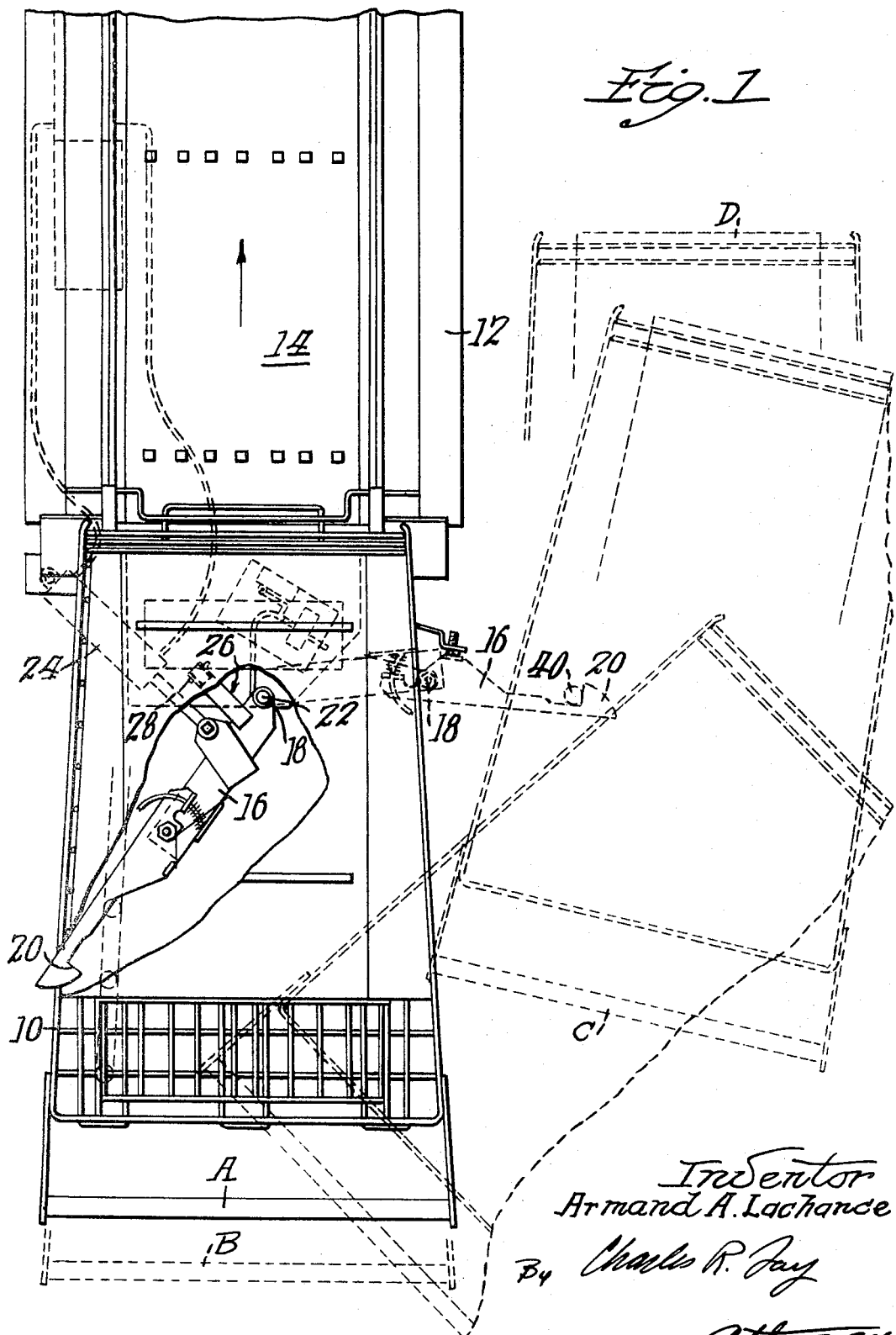

United States Patent Office 3,476,216
Patented Nov. 4, 1969

3,476,216
SAFETY DEVICE FOR AUTOMATIC
GROCERY CARTS
Armand A. Lachance, 133 Southbridge St.,
Auburn, Mass. 01501
Filed Dec. 14, 1967, Ser. No. 690,492
Int. Cl. E04h 3/04
U.S. Cl. 186—1
7 Claims

ABSTRACT OF THE DISCLOSURE

A safety device in cooperation with an automatic device which moves an unloaded cart out of the unloading station, and positioned with respect to a checkout stand to prevent a subsequent cart being positioned too quickly in unloading position, whereby a customer cannot position his cart in unloading position, until the device for automatically moving the preceding unloaded cart out of the unloading station, and comprising a stop dog movable e.g. by gravity into position to prevent the entry as above of the succeeding grocery cart until the proper moment.

---

Reference is made to copending application Ser. No. 581,528 filed Sept. 23, 1966 which is directed to a pivoted device for removing carts from checkout counters.

A swinging arm is provided which automatically removes an unloaded cart from the unloading station to clear the unloading station for the reception of a succeeding cart to be unloaded. The swinging arm must have a certain interval of time to swing out, engage the cart, move it laterally to a position clear of the unloading station, and then return to its normal inoperative position. During this time, it is possible for the operator of a succeeding cart to push the same into position where the arm, swinging back, will engage it and stop the action of the unloading operation.

This invention utilizes a gravity-actuated stop dog which moves into operative stopping position as soon as the arm has swung past it in its cart-removal motion, and is then automatically cammed out of the way to inoperative position by the arm itself as it returns to its inoperative poistion, so that as long as the dog is operative, the succeeding cart cannot be pushed or jammed into a position where it interferes with the return action of the swinging arm.

Other objects and advantages of the invention will appear hereinafter.

Reference is to be had to the accompanying drawings in which:

FIG. 1 is a general plan view showing mechanism of the present invention in cooperation with the swinging cart removal arm which is the subject matter of the above-identified application;

FIG. 2 is a view in side elevation thereof, and

FIGS. 3, 4 and 5 are diagrammatic views illustrating the action of the stop dog.

Referring now to FIGS. 1 and 2, a grocery cart is generally indicated at 10. This grocery cart is of the nesting type and is adapted to unload goods at the checkout counter 12 behind which the cashier stands and controls the operation of the mechanisms to be described, the merchandise in the cart being expelled and onto a conveyor 14 moving in the direction of the arrow in FIG. 1 to a position where the goods can be checked out by the cashier.

When the cart has been emptied, the cashier pushes a button or the like which initiates the operation of a swing-out arm generally indicated at 16. This arm is jointed at 18 and as shown in FIG. 1 is normally held in its extended condition having a hook-like member 20 at the end thereof for engaging a portion of the cart and moving it, by swinging in a counterclockwise direction, so that the cart is moved through the positions A, C and D whereby the succeeding cart B can then move into the position of the vacated cart A for a repeat of the operation.

The arm 16 is described in the above-identified application. In general however it pivots on a fixed pivot pin 22 under operation of energizing means such as an air cylinder or hydraulic ram 24 or the like having proper connections, etc. for operation under control of the cashier, and it is shown in its extreme inoperative poistion in solid lines and in its extreme operative position in dotted lines in FIG. 1. On its return motion from dotted to solid line position, the extreme end of the arm can move in a counterclockwise direction about pivot 18 even through the main body portion thereof is moving in a clockwise direction, so as to prevent injury to any person.

Referring now to FIGS. 3, 4 and 5, there is shown a stop dog generally indicated by the reference numeral 26. This dog is mounted on a horizontal pivot 28 on a plate 30 which may form a part of the framework of the checkout stand 12. It has an inclined forward face 32 and a depending stop lug or the like 34. There is also a fixed but adjustable stop member 36 to locate arm 16 in its inoperative position.

With the arm 16 in its extreme position shown in dotted lines in FIG. 1 which is also the position shown in FIG. 5, the stop dog 26 is in the FIG. 5 position, i.e., up, because the arm 16 has engaged inclined face 32 and raised the dog from the FIG. 4 position to the FIG. 5 position, as arm 16 swings through the final increments of its motion from dotted line to solid line position in FIG. 1. In this position the lug 34 is completely out of the way of the forward end portion 38 of the undercarriage 40 of the cart 10. In the FIG. 5 position of these members, the cart is in its correct position for unloading. However, when arm 16 swings toward the dotted line position, the stop dog is released thereby and drops, to rest on plate 30 positioning the lug 34 in the FIG. 4 position and preventing the succeeding cart from entering into the mechanism sufficiently to interfere with the action of arm 16. However as soon as arm 16 is once more located in the solid line position of FIG. 1, then the FIG. 5 action obtains.

In FIG. 2 there is a power roller generally indicated at 42 which is used to engage a belt 44 to discharge the contents of the cart 10 onto conveyor 14 as will be clear to those skilled in the art, but this is aside from the present invention which is concerned with the prevention of carts to be unloaded entering into the mechanism to too great a degree before the cart removal arm 16 is in its inoperative solid line position as shown in FIG. 1.

Having thus described my invention and the advantages thereof, I do not wish to be limited to the details herein disclosed, otherwise than as set forth in the claims, but what I claim is:

1. The combination with a checkout stand having an unloading station, and movable means for removing an unloaded cart from the unloading station to a position clear of the unloading station,
of means stopping a succeeding cart from entering the unloading station in a position to interfere with said cart removing means,
and interengaging means between said cart removing means and said cart stopping means, to inhibit the stopping action of said cart stopping means when the cart removing means returns to its normal inoperative position.

2. The combination of claim 1 wherein said stopping means is movable.

3. The combination of claim 1 wherein said stopping means is movable to an inoperative position by engagement with said cart removing means.

4. The combination of claim 1 wherein said stopping means is movable to an inoperative position by engagement with said cart removing means and moves to its cart stopping position under the influence of gravity.

5. The combination of claim 1 wherein said cart removing means comprises a swinging member acting to release the cart stopping means as it moves in one direction and to move it to out of the way inactive position in the opposite direction.

6. The combination of claim 1 wherein said cart removing means comprises a pivoted member mounted on a vertical axis and said stopping means comprises a pivoted member mounted on a horizontal axis, and interengaging means between the cart removing means and the cart stopping means for moving the latter to inactive position upon movement of said cart removing pivoted member to inoperative position.

7. The combination of claim 1 wherein said cart removing means comprises a pivoted member mounted on a vertical axis and said stopping means comprises a pivoted member mounted on a horizontal axis, and interengaging means between the cart removing means and the cart stopping means for moving the latter to inactive position upon movement of said cart removing pivoted member to inoperative position, said cart stopping pivoted member dropping by gravity into a cart stopping position upon release thereof by said cart removing pivoted member.

References Cited

UNITED STATES PATENTS

| | | | |
|---|---|---|---|
| 2,791,291 | 5/1957 | Grondont | 186—1.1 |
| 3,196,984 | 7/1965 | Stout | 186—1.1 |

EVON C. BLUNK, Primary Examiner

H. C. HORNSBY, Assistant Examiner